(12) United States Patent
Lieberman

(10) Patent No.: US 11,487,745 B2
(45) Date of Patent: Nov. 1, 2022

(54) WORKFLOW DEPENDENCY MANAGEMENT SYSTEM

(71) Applicant: Amazon Technologies, Inc., Seattle, WA (US)

(72) Inventor: Joshua Lieberman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 16/749,932

(22) Filed: Jan. 22, 2020

(65) Prior Publication Data

US 2020/0159718 A1    May 21, 2020

Related U.S. Application Data

(63) Continuation of application No. 15/381,005, filed on Dec. 15, 2016, now Pat. No. 10,545,951.

(51) Int. Cl.
| | |
|---|---|
| *G06F 7/00* | (2006.01) |
| *G06F 16/23* | (2019.01) |
| *G06F 16/21* | (2019.01) |
| *G06F 16/215* | (2019.01) |
| *G06F 16/245* | (2019.01) |
| *G06F 16/25* | (2019.01) |

(52) U.S. Cl.
CPC ........ *G06F 16/2365* (2019.01); *G06F 16/211* (2019.01); *G06F 16/215* (2019.01); *G06F 16/245* (2019.01); *G06F 16/258* (2019.01)

(58) Field of Classification Search
CPC .. G06F 16/2365; G06F 16/258; G06F 16/211; G06F 16/215; G06F 16/245; G06F 17/30371; G06F 17/30303; G06F 17/30292; G06F 17/30424; G06F 17/30569; G06Q 10/0633
See application file for complete search history.

(56) References Cited

U.S. PATENT DOCUMENTS

| | | | |
|---|---|---|---|
| 6,058,413 A * | 5/2000 | Flores | G06F 8/20 |
| | | | 718/101 |
| 6,065,009 A | 5/2000 | Leymann et al. | |
| 7,058,615 B2 | 6/2006 | Yao | |
| 7,275,039 B2 | 9/2007 | Setteducati | |
| 7,350,188 B2 | 3/2008 | Schulz | |
| 7,363,594 B1 | 4/2008 | Wright et al. | |
| 7,451,432 B2 | 11/2008 | Shukla et al. | |
| 7,529,762 B2 | 5/2009 | Casati et al. | |
| 7,805,327 B1 | 9/2010 | Schulz et al. | |
| 7,849,049 B2 | 12/2010 | Langseth et al. | |

(Continued)

OTHER PUBLICATIONS

"Amazon Simple Workflow Service—Developer Guide", Amazon WebServices, API Version, Jan. 25, 2012, pp. 1-192.

*Primary Examiner* — Mohammed R Uddin
(74) *Attorney, Agent, or Firm* — Robert C. Kowert; Kowert, Hood, Munyon, Rankin & Goetzel, P.C.

(57) ABSTRACT

At a resource corresponding to one node of a data processing workflow, a persistent representation of a binary signal representing a condition associated with an event is generated. The signal indicates a validity period of the condition. At a second resource corresponding to another node of the workflow, a decision to initiate an action is generated based on analysis of a set of binary signals and an action scheduling rule, and the action is initiated.

20 Claims, 9 Drawing Sheets

(56) References Cited

U.S. PATENT DOCUMENTS

| | | |
|---|---|---|
| 8,570,545 B2 | 10/2013 | Okunishi et al. |
| 8,660,905 B2 | 2/2014 | Weber et al. |
| 8,768,741 B1 | 7/2014 | Hinton et al. |
| 8,806,490 B1 | 8/2014 | Pulsipher |
| 9,152,460 B1 | 10/2015 | Adogla et al. |
| 9,189,515 B1 * | 11/2015 | Tamilmani ........ G06F 16/24532 |
| 9,311,144 B1 | 4/2016 | Krishnamoorthy |
| 9,317,822 B2 | 4/2016 | Bohm et al. |
| 10,545,951 B1 | 1/2020 | Lieberman |
| 2002/0055849 A1 | 5/2002 | Georgakopoulos et al. |
| 2002/0138321 A1 | 9/2002 | Yuan et al. |
| 2004/0078778 A1 | 4/2004 | Leymann et al. |
| 2004/0083448 A1 | 4/2004 | Schulz et al. |
| 2005/0228885 A1 | 10/2005 | Winfield et al. |
| 2006/0026595 A1 | 2/2006 | Nakayama et al. |
| 2007/0174101 A1 | 7/2007 | Li et al. |
| 2007/0240046 A1 * | 10/2007 | Yan ........................ G06Q 10/06 715/700 |
| 2007/0245300 A1 | 10/2007 | Chan et al. |
| 2007/0250365 A1 | 10/2007 | Chakrabarti et al. |
| 2007/0260499 A1 | 11/2007 | Greef et al. |
| 2008/0077530 A1 * | 3/2008 | Banas ............... G06Q 10/06313 705/50 |
| 2009/0122706 A1 | 5/2009 | Alfano et al. |
| 2010/0058343 A1 | 3/2010 | Kikuchi |
| 2010/0324948 A1 * | 12/2010 | Kumar ............ G06Q 10/06311 705/7.13 |
| 2011/0071869 A1 * | 3/2011 | O'Brien ............... G06Q 10/103 705/7.12 |
| 2011/0145037 A1 | 6/2011 | Domashchenko et al. |
| 2011/0178832 A1 | 7/2011 | Burchard et al. |
| 2011/0288900 A1 | 11/2011 | McQueen et al. |
| 2013/0018694 A1 | 1/2013 | Dubbels et al. |
| 2014/0310328 A1 | 10/2014 | Charif et al. |
| 2014/0337071 A1 * | 11/2014 | Stiffler ............. G06Q 10/06311 705/7.13 |
| 2016/0162478 A1 | 6/2016 | Blassin et al. |
| 2016/0217017 A1 | 7/2016 | Ding et al. |
| 2016/0350160 A1 | 12/2016 | Hamway et al. |
| 2017/0337492 A1 | 11/2017 | Chen et al. |
| 2018/0157710 A1 * | 6/2018 | Guirguis ................. G06F 16/27 |

\* cited by examiner

WORKFLOW DEPENDENCY MANAGEMENT SYSTEM

This application is a continuation of U.S. patent application Ser. No. 15/381,005, filed Dec. 15, 2016, which is hereby incorporated by reference herein in its entirety.

BACKGROUND

The amount of data that has to be processed to manage the operations of many enterprises, such as large-scale e-retail enterprises, has grown tremendously in recent years, especially as the customer bases of the enterprises have expanded to include millions of users spread across numerous countries and time zones, and as the product catalogs of the enterprises have expanded to include millions of objects. For some enterprises, for example, hundreds of gigabytes of operational data such as changes to inventory, pricing, sales results, supply chain status, expected demands, marketing campaigns, and the like may be generated and analyzed every day.

Software applications generated to automate various aspects of business operations sometimes represent business processes as workflows of jobs, with dependencies defined between various jobs. A given type of business process or application may, for example, be represented as a graph whose nodes represent respective jobs or tasks, and whose edges represent logical or data dependencies among the jobs or tasks. For example, warehousing-related applications of a large-scale retailer may involve the scheduling and execution of hundreds or thousands of workflow instances each day, with individual ones of the workflow instances comprising dozens or hundreds of jobs corresponding to respective workflow definitions or graphs. The jobs, as well as input data sets generated by diverse sources in different formats, and output data sets which may have varying formats depending on their destinations, may sometimes be stored as objects within databases or other types of storage repositories.

Many of the costs associated with data processing have fallen substantially in recent years, and such cost reductions may allow larger amounts of data associated with complex business workflows to be stored and analyzed relatively cheaply, e.g., using cloud based computing and storage services. Nevertheless, in at least some large scale workflow management systems, generating efficient responses to job status queries may represent a non-trivial technical challenge, due at least in part on the complexity of inter-job dependencies. In addition, the complexity and time-dependent nature of the dependencies may sometimes result in hard-to-diagnose errors in implementing the workflows.

Figure 1:
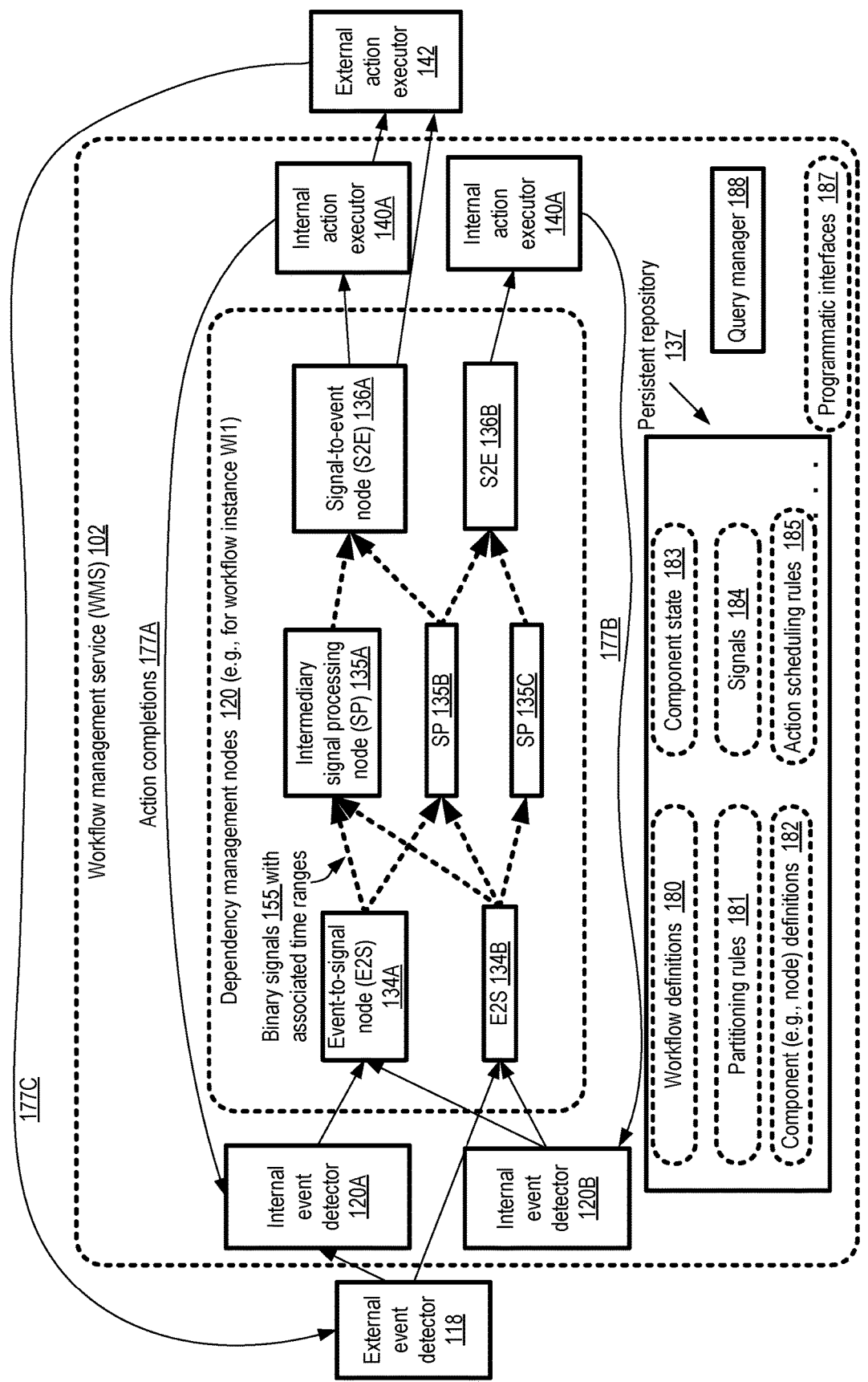
FIG. 1 illustrates an example system environment in which a persistent binary signal may be used to represent temporal aspects of workflow dependencies, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing dependencies associated with various types of workflow operations are described. At a high level, in at least some embodiments persistent binary signals may be used to process dependencies between workflow tasks. A given binary signal may comprise a temporal component indicating one or more validity periods during which a condition corresponding to an event (e.g., whether the event completed successfully or not) can be used as input in decisions made at various components of a given workflow. For example, an event indicating that a first phase P1 of data processing associated with a workflow W1 has been completed may be represented by a binary signal being set to "1" (indicating that P1 concluded successfully) and a validity time period of 10:00:00 GMT-11:59:59 GMT on some date for the "1", indicating that a subsequent phase P2 of W1, which depends on the completion if P1, may be initiated during the specified time window assuming that all of P2's other dependencies are met.

In addition to the temporal information, individual binary signals may also be associated with respective partitions or shards of a workflow namespace in some embodiment. For example, in a geographically distributed warehousing environment, different partitions of a warehousing database may be defined in terms of the geographical locations with which events are associated, legal jurisdictions applicable to the events, and so on. By using a partitioning scheme of an appropriate granularity, in which respective sets of workflow resources are assigned to process events of respective partitions of the namespace, the implementations of the workflows may be considerably simplified in some embodiments. For example, in one embodiment a given workflow component responsible for events associated with a particular partition may be implemented using a single thread of execution which does not need to utilize a concurrency control algorithm for persisting state changes. Concurrency control may not be required in such an embodiment under the assumption that events relevant to a single partition may be expected to occur in sequence, even though events associated with other partitions may be occurring concurrently. In at least one embodiment, the logic or rules for processing events and signals may differ from one partition to another—for example, if one partition is associated with actions performed in a first legal jurisdiction, and a second partition is associated with actions performed in a second legal jurisdiction, the implementation of the operations and corresponding signals may differ for the two partitions.

A variety of categories of dependency management components or nodes may be implemented as part of a given workflow in different embodiments. In one embodiment, such categories may include, for example, (a) event-to-signal nodes at which persistent binary signals are generated as output based on the detection of various types of input events, (b) signal-to-event nodes at which requests to perform actions (which may in turn result in, or represent, other events) may be generated based on the analysis of some combination of input binary signals, and (c) signal processing nodes at which schema transformations, mappings between attribute values, and logical operations analogous to unions, intersections, multiplexing or de-multiplexing of input binary signals to generate corresponding output binary signals may be performed as discussed below in further detail. Depending on the problem domain being addressed using a workflow, a wide variety of event types may be processed in various embodiments. For example, in one embodiment in which ETL (Extract, Transform and Load) workflows are executed, a given event may comprise a completion of an insertion of a data set into one or more repositories, a completion of an extraction of a data set from one or more repositories, a completion of a transformation of a data set from a first format to a second format, a completion of a cleansing or normalization operation on a data set, and so on.

In at least one embodiment, while at least some of the binary signals themselves may have continuous validity periods, the signal-to-event nodes may be configured (e.g., by providing various action scheduling rules) to initiate actions or events at discrete time intervals. In one example scenario, a particular signal-to-event node which requests a data processing operation DP1 based on the analysis of various input binary signals may be constrained to issue such requests only at hourly intervals. As such, a signal-to-event node may be described as discretizing continuous-valued inputs into discrete-valued outputs in at least some embodiments. In at least some embodiments, custom or irregular schedules for initiating actions may be supplied as inputs to at least some signal-to-event nodes—e.g., initiation of one type of event may not be permitted during a specified set of holidays in a given geographical region but may otherwise be permitted once every working day, and the set of holidays may vary from one region to another.

In some embodiments, one or more services of a provider network may be used for various aspects of workflow management. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. Some services of a provider network may be built using other resources of the provider network. In one embodiment, a workflow management service which utilizes the binary signal-based approach towards management of temporal and partition-based dependencies discussed herein may represent one of the services of a suite of services of a provider network. Such a workflow management service may, for example, utilize computing resources of a virtualized computing service of the provider network for the processes which implement dependency management tasks and/or a storage management service to store definitions, rules, and persistent state for various nodes or components. In one embodiment, a provider network may implement a stream management service which can be used to detect, and generate notifications representing, various types of events, and such a stream management service may be used to notify event-to-signal nodes associated with various workflows.

According to some embodiments, persistent representations of a variety of workflow definitions for various types of applications may be stored, with each workflow definition comprising a graph of nodes and an associated set of input parameters or metadata (such as partitioning rules, action scheduling rules, etc.), e.g., at a workflow management service on behalf of various clients or users. In one embodiment, such a graph may comprise one or more event-to-signal nodes, zero or more signal processing nodes, and one or more signal-to-event nodes, with the edges of the graph representing logical communications (e.g., input or output signals, requests to external action executors, etc.) Such a workflow definition may be considered a template in various embodiments; respective instances or executions of the template or definition may be started up as and when needed or requested by clients of the workflow management service. In at least some use cases, depending on the requirements of the application, a given workflow instance, which may involve numerous iterations of data collection, processing and transformation steps, may run for long periods of time such as weeks or months.

In one embodiment, a particular instance of a workflow definition may be launched, e.g., in response to a request received via a programmatic interface such as a web-based console, an application programming interface (API), a command line tool, a graphical user interface, or the like. Operations performed in response to such a launch request may comprise identifying a set of computing devices (e.g., various virtual or physical machines) at which the processes or other resources corresponding to the various nodes of the graph are to be instantiated, starting up the processes, providing partitioning information to the processes if necessary, configuring/initializing communication mechanisms among the processes, associated storage devices, event sources, and action executors, and so on, in various embodiments. It is noted that in some embodiments, resources other than processes may be utilized to implement the logic associated with different workflow or dependency management nodes—e.g., different threads of a single process may be used for different nodes, each node may be implemented at different virtual or physical host, and so on. In at least some embodiments, a plurality of partition-specific resources may collectively implement the logic of a given graph node—e.g., if the namespace of a workflow application is divided into 16 partitions, 16 threads may be instantiated at an event-to-signal node, each responsible for generating signals corresponding to one of the partitions. In at least one embodiment, various instances or replicas of a generic event processor may be used to implement the logic of the different workflow nodes, with input parameters or configuration files used to distinguish the particular operations performed at one event processor instance from the operations performed at another. In the following description, with respect to various embodiments, the term "node" may sometimes be used to refer to the particular resource or combination of resources which implement the logic of a given event-to-signal node, signal-to-event node or signal processing node discussed above.

After the various processes or other resources of a workflow instance corresponding to a graph have been initialized, in some embodiments the resources corresponding to at least one event-to-signal node may determine that a particular event associated with a particular partition of a first workflow namespace has occurred. A persistent representation of a first binary signal, indicating at least one validity time period or time range during which the occurrence of the particular event is to be considered a contributory factor for a decision or operation at one or more other nodes of the graph, may be generated and stored by an event-to-signal node in such an embodiment. The information indicated by the signal may be propagated using a variety of mechanisms in different embodiments to one or more other resources corresponding to other nodes of the graph. In some embodiments, the storing of the persistent representation of the binary signal may trigger a notification to one or more other nodes (which may have subscribed to a notification service, for example, which is configured to respond to changes applied at a storage service); in other embodiments, messages may be transmitted from some nodes to other nodes indicating state changes, or a polling mechanism may be used by the nodes which have been configured to react to a change in the binary signal. In various embodiments, push-based mechanisms (in which the source of a communication is responsible for propagating the communication to a destination), pull-based mechanisms (in which an interested destination entity is responsible for obtaining contents of communications from a source), or a combination of push-based or pull-based mechanisms may be used with respect to binary signals.

In some embodiments, a determination may be made, by respective resources corresponding to one or more other nodes of the graph, based at least in part on (a) an analysis of one or more binary signals including the first binary signal, and (b) an action scheduling rule, that a particular action is to be initiated at a selected time. A signal-to-event node may, for example, transmit a request for the particular action to an action executor (e.g., a different service or network endpoint external to the workflow management service) indicated in the workflow definition. A completion of the particular action, and/or the request to initiate the particular action, may itself represent another event detectable at one or more event-to-signal nodes in at least some embodiments. Respective records of the request to initiate the particular action, and/or any intermediate processing transformations which resulted in output binary signals at signal processing nodes in response to the initial binary signal, may also be stored in persistent storage in at least some embodiments. The stored binary signals may, in various embodiments, be used to generate responses to various types of queries received at the workflow management service. E.g., to prepare a response to queries logically equivalent to "Why has data processing operation O1 not been initiated yet as of time T1"? or "What is the status of operation O1?", the state of the signals which contribute to the initiation of operation O1 may be read from a persistent signal repository. In some cases, a path connecting several nodes of the workflow graph may be traversed or navigated to respond to a query or a set of related queries, e.g., to follow a chain of dependencies and associated binary signal states which may have to be analyzed to prepare a response.

In at least one embodiment, multi-valued signals other than binary signals may be used to manage dependencies among various workflow tasks. For example, state information associated with a given event may be represented using a "0", "1" or a "−1", (or, in another example, a "1", "2", "3" or "4") with associated validity intervals, rather than using only two distinct values "0" and "1" in one such embodiment. To simplify the presentation, binary signals are discussed as the primary examples of signals in much of the following presentation. It is noted that the techniques discussed above, of using persistent signals with associated validity time range information, and of partitioning workflow namespaces and the corresponding workflow management workloads, may be used with equal success in various embodiments, regardless of the number of distinct values or levels that the persistent signals may assume.

Example System Environment

FIG. 1 illustrates an example system environment in which a persistent binary signal may be used to represent temporal aspects of workflow dependencies, according to at least some embodiments. As shown, system 100 may comprise various elements of a workflow management system 102. The workflows designed and implemented using service 102 may pertain to a variety of problem domains in different embodiments, including for example to a set of warehousing-related applications of a large e-retailing enterprise. In the depicted embodiment, service 102 may comprise a persistent repository 137 in which workflow-related artifacts of various types may be stored, including for example workflow definitions 180 (e.g., respective graphs of interconnected workflow management nodes), workflow namespace partitioning rules 181, definitions/specifications of components or nodes 182 of individual workflows, component state information 183 regarding currently active workflow instances, and representations of signal state information.

In at least some embodiments the service 102 may include one or more query managers 188. The query managers may respond to queries regarding workflow states, actions or events associated with various partitions of workflow namespaces, and the like, received via one or more programmatic interfaces 187 of service 102 in the depicted embodiment. A variety of programmatic interfaces, including for example web-based consoles, APIs, command-line tools or graphical user interfaces may be implemented in different embodiments. In at least one embodiment, in addition to being used for queries, programmatic interfaces 187 may also be used to define new workflows (e.g., using a graphical drop-and-drag interface in which different types of workflow nodes are represented using respective icons), request instantiation of new workflows, terminate running workflows, and so on. Responses to queries and requests received via the programmatic interfaces 187 may be prepared, for example, by analyzing contents of the repository 137 and/or by communicating with processes executing workflow instances in different embodiments. For example, in response to queries regarding the status of a particular action or event of a particular workflow, records of the associated signals 184 may be examined from repository 137.

FIG. 1 shows a set 120 of workflow management nodes 120, which correspond to a particular instance WI1 of a workflow definition 180. At a high level, the workflow instance WI1 may comprise respective sets of resources (e.g., processes or threads) corresponding to a plurality of node types specified in a graph of the workflow definition 180, which communicate with one another using persistent binary signals as indicated by the directed edges of the workflow definition. In the depicted example, the workflow instance WI1 may comprise respective resources implementing three types of nodes: event-to-signal nodes (E2Ss) 134A and 134B, intermediary signal processing nodes (SPs) 135A, 135B and 135C, and signal-to-event nodes (S2Es) 136A and 136B. An E2S node 134 may receive notifications of, or otherwise detect, events whose types and sources are specified in the workflow definition in various embodiments. Some of the events may involve operations or actions performed and/or detected inside the workflow management service 102 (e.g., events which represent various computations performed using devices of the service 102 itself, such as internal action executors 140A or 140B), while others may involve operations or actions performed and/or detected outside the workflow management service 102 (e.g., using external action executors 142 at other services). In the depicted embodiment, internal event detectors such as 120A and 120B may notify E2S nodes such as 134A or 134B when new events which are relevant to WI1 occur, while an external event detector 118 may notify the E2S nodes (or the internal event detectors) when external actions are completed and detected.

In response to obtaining information about a particular event, a given E2S node may at least in some cases generate a persistent binary signal 155 with one or more associated time ranges in the depicted embodiment. The time ranges, may, for example, indicate period during which a particular value (e.g., "1" or "0") of a signal remains valid or usable as an input at a downstream node of the graph. (A given node such as 135A may be said to be downstream of another node such as 134A in the depicted embodiment, if node 135A can be reached via a path comprising one or more directed edges originating at node 134A; similarly, if a path comprising one or more directed edges of the graph leads from a node such as 134A to another node such as 136, node 134A may be said to be upstream of node 136A.) In some embodiments, events may be assigned respective unique sequence number (e.g., at the workflow management service itself, or by external event detectors), and such sequence numbers may be stored and propagated as part of the binary signals generated in response to the events. The signals may be logically transmitted to adjacent nodes of the graph, e.g., either via messages or using a notification mechanism which responds to certain types of updates in the repository by notified registered entities. Individual signals 155 may have associated schemas indicating a set of object types and associated attributes in some embodiments. At intermediate SPs 135, such as 135A-135C, one or more transformations may be applied to a set of input persistent binary signals to produce a set of output binary signals in the depicted embodiment. For example, the schema associated with the output signals may differ from the schema associated with an input signal, one or more input attribute values may be mapped to different output attribute values, the output binary signals may be produced by applying logical functions to the input binary signals, and so on as discussed below.

An indication of a binary signal produced by an E2S node, or of one or more signals derived (by a chain of one or more SPs) from the binary signal produced by the E2S node may eventually reach resources implementing a signal-to-event (S2E) node 136 (such as 136A or 136B). Based at least in part on the analysis of its input binary signals and/or based on one or more action scheduling rules 185, a given S2E node 136 may determine that an action is to be initiated at a particular time, and transmit a corresponding request to an internal action executor 140 (e.g., 140A or 140B) or an external action executor 142. As each of the nodes of WI1 completes its processing of a particular set of inputs, it may update zero or more output signals 184 and/or its own state 183 stored in repository 137. Completions 177 (e.g., 177A-177C) of the requested actions (and/or the initiations of the actions) may represent new events in the depicted embodiment, which may be detected by event detectors 118 and/or 120. As such, feedback loops may be implemented in the workflow instance WI1 in the depicted embodiment, with new events being iteratively generated as a result of some earlier events. It is noted that not all actions initiated by S2E nodes 136 may necessarily result in new events being detected in the depicted embodiment—e.g., in some cases, the actions may result in state changes at other services which are not detected or recorded at service 102. Workflow instance WI1 may continue to run indefinitely in some embodiments, or may be terminated after some number of events have been processed or in response to a programmatic request.

In at least some embodiments, the processing performed at the E2S, SP and/or S2E nodes shown in FIG. 1 may be distributed based on partitioning rules 181. For example, in one embodiment, at each of the E2S nodes, a respective thread or process may be responsible for processing input events associated with one or more partitions of the workflow namespace associated with the workflow definition. In at least some embodiments, such partition-based workload distribution may be implemented at SP and/or S2E nodes as well. An indication of the partition associated with a given binary signal may be stored as part of the signal in some embodiments. In one embodiment, as a result of utilizing partition-specific resources to implement the logic of the workflow nodes, concurrency control mechanisms may not have to be used with respect to updating signals 184 and/or component states 183. In other embodiments, concurrency control mechanisms, such as locking-based mechanisms and/or optimistic concurrency control protocols involving conditional writes may be used.

Example Dependencies in Warehousing Applications

Figure 2:
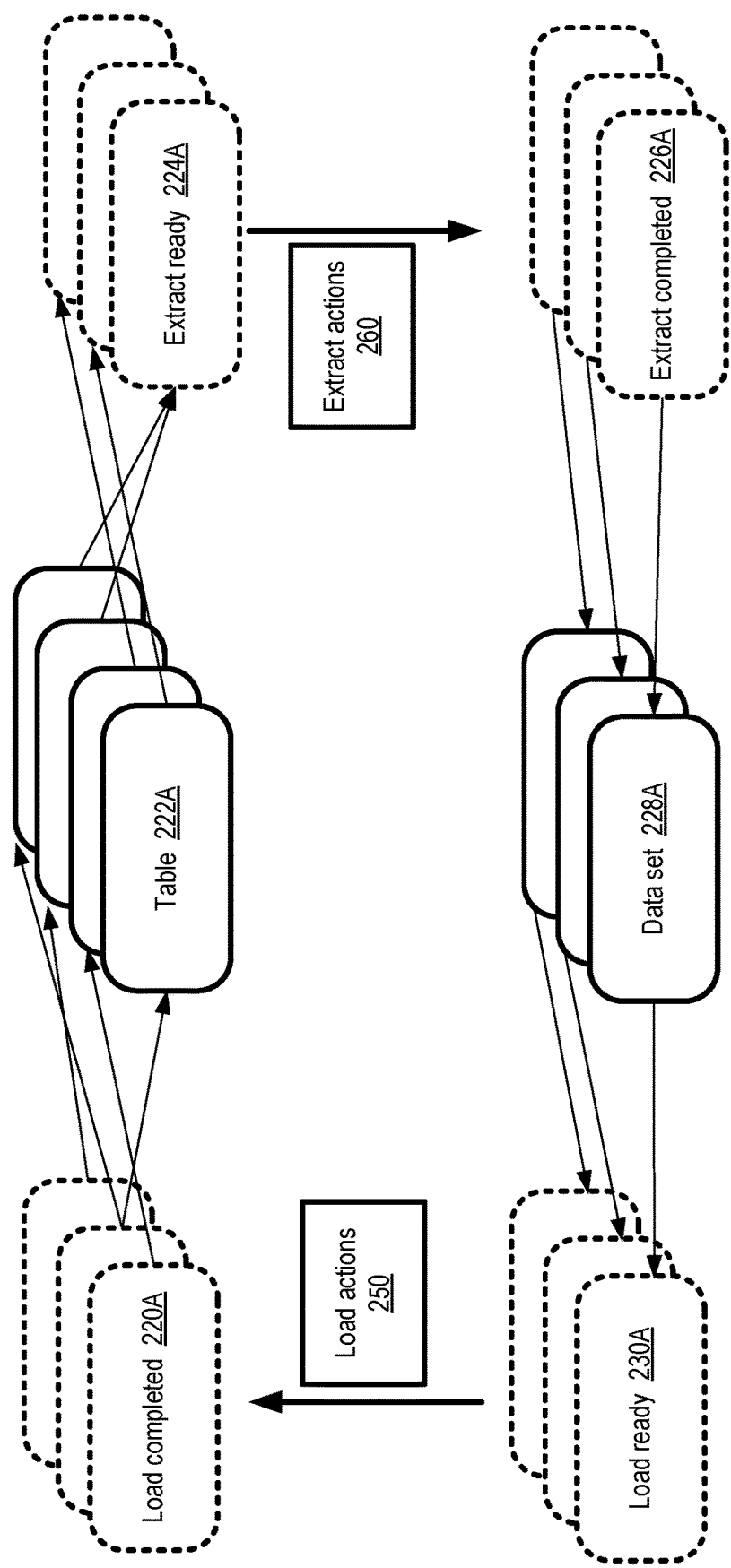
FIG. 2 illustrates simple examples of data warehousing-related operations whose dependencies may be managed at a workflow management system, according to at least some embodiments.

FIG. 2 illustrates simple examples of data warehousing-related operations whose dependencies may be managed at a workflow management system, according to at least some embodiments. In many data warehousing applications, a substantial amount of processing may be performed according to the ETL (Extract, Transform and Load) model or paradigm. In the ETL model, data may be iteratively converted from a form in which it is convenient to perform computations on it, e.g., in one or more database tables 222 such as table 222A, to a form in which it is more convenient to export and transfer, e.g., as data sets 228 (e.g., 228A). The process of inserting a data set into one or more tables 222 may be referred to as a load action 250, while the process of generating an exportable/transferable data set may be referred to as an extract action 260 in the depicted embodiment.

In various embodiments, for at least some applications, data may have to be extracted from multiple tables, with the particular combination of source tables varying from one ETL iteration to another based on the results of earlier ETL iterations. Similarly, the data sets 228 extracted, and/or the destination tables 222 may also differ from one iteration to another. Multiple tables may be loaded to and extracted from in some embodiments, for example, to perform join operations required by the application. In at least some embodiments, the load and/or extract operations may consume non-trivial amounts of time. As such, distinct events may be used to represent a state when a particular load action can be initiated (e.g., "load ready 230A") and when the load action terminates successfully (e.g., "load completed 220A") in the depicted embodiment. Similarly distinct events may be used to represent a state when a particular extract action can be initiated (e.g., "extract ready 224A") and when the extract action terminates successfully (e.g., "extract completed 226A") in the depicted embodiment. In the simple example illustrated, an extract action 260 may be dependent on the occurrence of one or more corresponding extract ready events 224, while a load action 250 may depend on the occurrence of one or more corresponding load ready event 230s. Similarly, an extract ready event 224 may depend on one or more corresponding load completed events 220, while a load ready event 230 may be dependent on one or more corresponding extract completed events 226. In various embodiments, workflow dependencies representing variations of the ETL model illustrated in FIG. 2 may be managed using the persistent binary signal based techniques described herein. Other types of events and workflow tasks, unrelated to ETL, may be modeled using persistent binary signal based techniques in at least some embodiments.

Persistent Binary Signals

Figure 3:
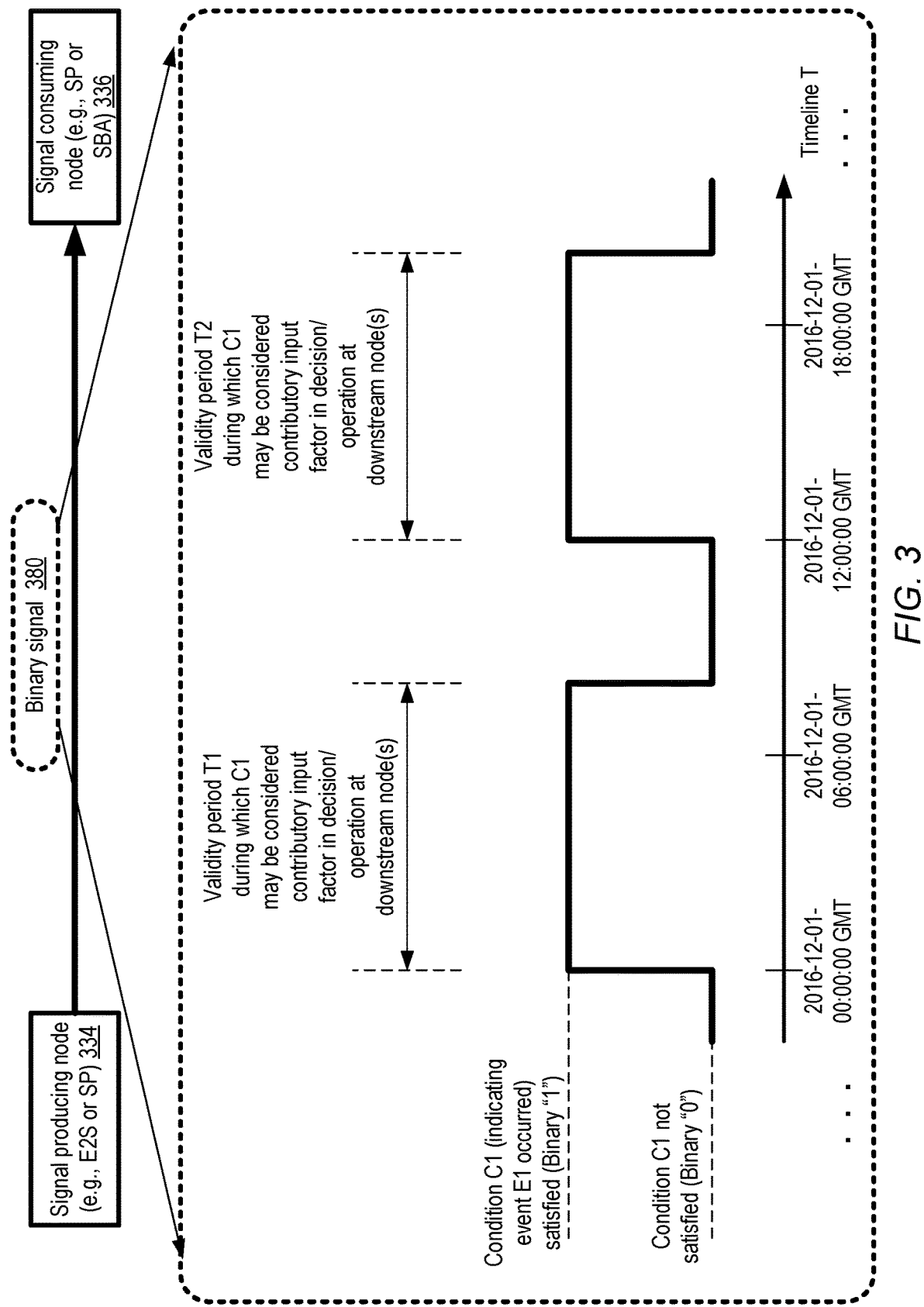
FIG. 3 illustrates an example of a binary signal which may be generated at a workflow manager node, according to at least some embodiments.

FIG. 3 illustrates an example of a binary signal which may be generated at a workflow management node, according to at least some embodiments. As shown, a binary signal 380 may be generated at a signal producing node 334 (such as an E2S or event-to-signal node, or an SP or signal processing node) and propagated to a signal consuming node (such as an S2E or signal-to-event node or another SP node) in the depicted embodiment.

As shown, the signal 380 may comprise two kinds of information in the depicted embodiment: a value (e.g., "1" or "0", indicating the truth value or satisfaction value of a condition C1, such as whether occurrence of a particular event has been detected) and one or more time periods in which that value holds or is valid, and thus may be used to make decisions or perform computations at one or more downstream nodes. In the depicted example, a timeline T1 is shown, and two periods T1 and T2 are shown during which the condition C1 (or the "1" value) remains valid. As mentioned earlier, in at least some embodiments, a signal may encode more than just one of two possible values—e.g., an event may be represented using three different values—one value (e.g., "2") representing a completion of an action, a second value (e.g., "1") for partial completion of an action with a likelihood of success greater than a threshold, and a third value (e.g., "0") indicating a failure of an action. Examples of data structures or objects which may be used to store persistent representations of binary or other multi-valued signals and associated workflow-related entities are discussed below in the context of FIG. 7.

Example Partitioning of Workflow Namespaces

For many long-running iterative applications managed using workflows, while a common high-level set of tasks may have to be performed in each iteration, details of individual tasks performed in a given iteration or instance of the workflow may differ in a data-dependent way. For example, as mentioned earlier, in some embodiments actions may be triggered according to a discretizing scheduling rule at S2E nodes, which constrains the intervals between successive action requests. The details of the scheduling rule may differ depending on, for example, the geographical location in which the actions are being performed, or based on other factors which in turn correspond to the particular portion of the workflow's namespace being dealt with by the workflow instance. In some embodiments, the namespace of a given workflow (or, more specifically, the namespace associated with a given workflow definition) may refer to the combinations of ranges of permissible attribute values of the different data object types processed in the workflow. The workflow namespace may be partitioned along a plurality of application-dependent attributes in some embodiments, and respective sets of resources may be assigned to the individual partitions, e.g., for load balancing, simplification of implementation by eliminating the need for concurrency control with regard to updates of at least some persistent state information, and so on.

Figure 4:
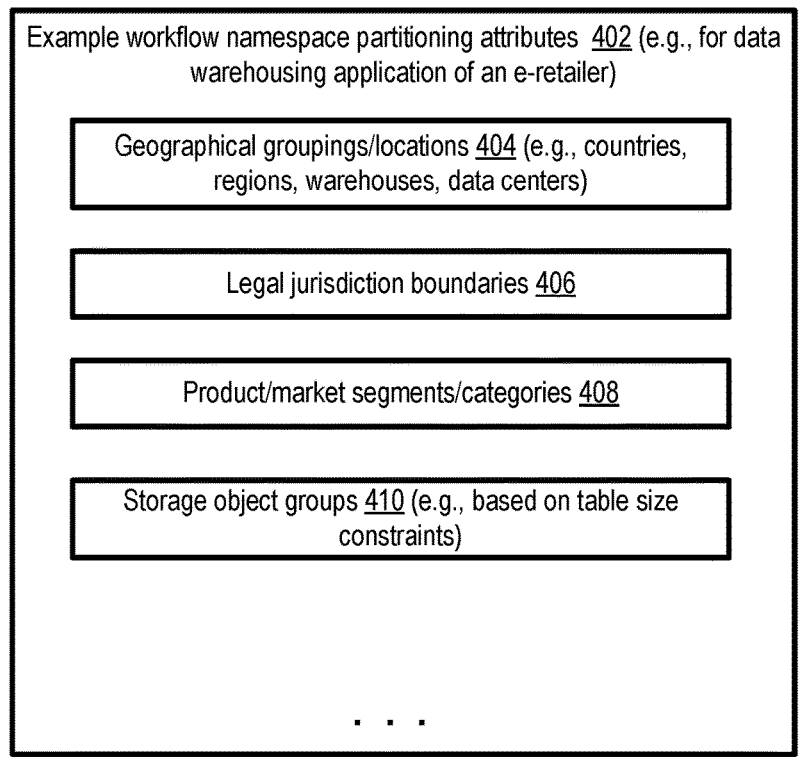
FIG. 4 illustrates example attributes which may be used for partitioning a workflow namespace, and an example of partition-based workflow workload distribution, according to at least some embodiments.
Figure 4:
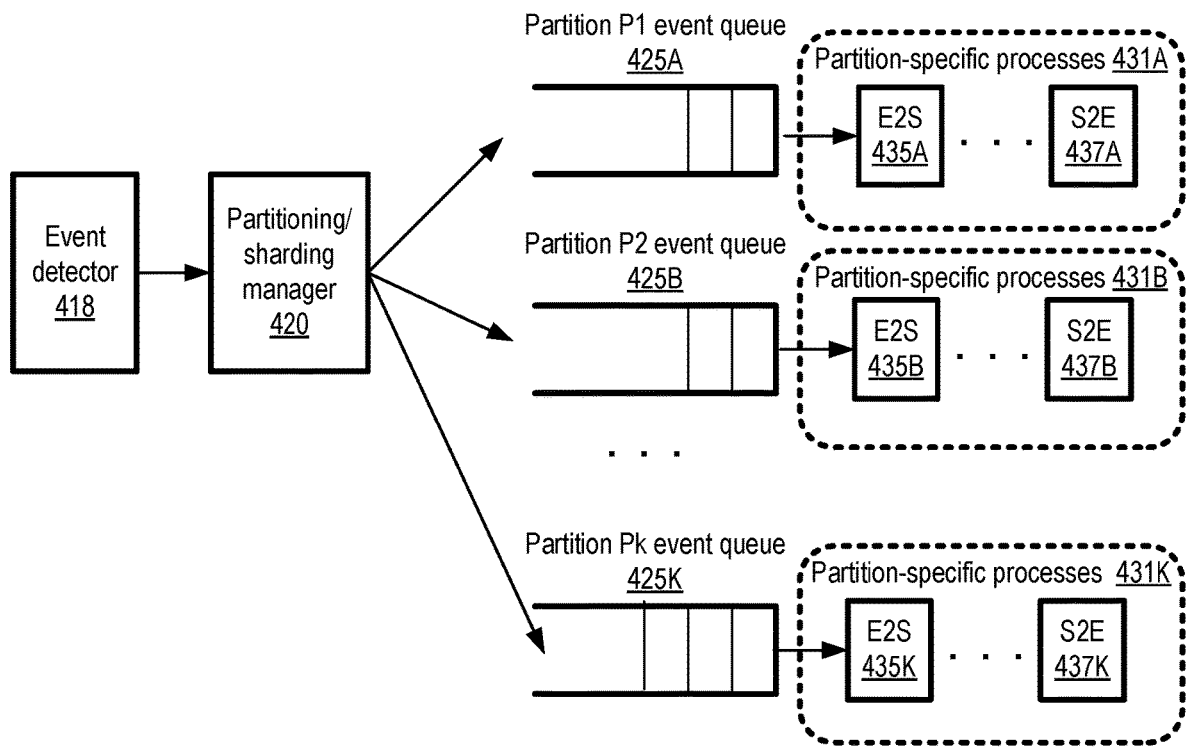

FIG. 4 illustrates example attributes which may be used for partitioning a workflow namespace, and an example of partition-based workflow workload distribution, according to at least some embodiments. In the example shown, workflows are to be managed for a data warehousing application of a large e-retailer. Example attributes 402 which may be used to define partition boundaries in the depicted embodiment may include geographical groupings or locations 404, legal jurisdiction boundaries 406, product/market segments or categories 408, and/or storage object groupings 410.

The organization for which the data warehousing application is run may operate in numerous countries around the world, and at several different cities, states or provinces within a given country in some cases. Data centers and/or physical warehouses may be maintained in numerous locations. When dealing with products, inventories and the like, information about the geographical location of the product may impact the details of the workflow actions to be performed—e.g., some countries may have different working hours and holiday schedules than others. By subdividing the workflow management operations on the basis of geographical groupings 404, responding to location-based differences in the workflow actions and processing may be made easier in the depicted embodiment. Similar reasoning may apply to dealing with different legal jurisdictions 406 and/or different product segments 408 or market segments in at least some embodiments. In some embodiments, the amount of data that has to be processed for a given workflow may potentially be so large that the data may not fit into a given table or other logical storage container (or, if it does fit, processing operations on the storage container may become unwieldy or non-performant). As a result, the input and/or output data set for a given phase or node of a workflow may be subdivided into multiple storage objects or containers, and separate resources of the workflow management system may be assigned to deal with the different storage object groups 410.

In some embodiments, a partitioning or sharding manager component 420, which may be implemented as part of the workflow management system or service, may be responsible for identifying the specific partition with which a given event detected by an event detector 418 is to be associated. In one embodiment, the partitioning manager may be part of a stream management service which is external to, and utilized by, the workflow management service. An algorithm which maps attribute values of a detected event to a particular partition of the workflow namespace, e.g., using one or more hash functions or range partitioning functions, may be used to select the particular logical event queue 425 (e.g., event queue 425A for a partition P1, event queue 425B for partition P2, event queue 425K for partition Pm, and so on) into which a record of the event is placed in the depicted embodiment. In at least some embodiments, respective sets of partition-specific resources such as processes 431A-431K may be designated to handle events and associated workflow operations of the different partitions. For example, if an event is mapped to partition P2, an E2S process 435B may convert the event into a persistent binary signal of the kind discussed above, propagate the signal to adjacent nodes, and an S2E process 437B may eventually generate a request for a corresponding action. It is noted that the relationship between partitions and workflow management resources need not necessarily be 1:1—e.g. in at least one embodiment, a given set of workflow management processes may be responsible for multiple partitions, or events associated with a given partition may be assigned to multiple workflow management processes. In one embodiment, for at least some workflow definitions, partitioning of the workflow namespace may not be required. The instantiation of respective resources (such as processes or threads) to implement the logic of different nodes may be considered another form of partitioning in some embodiments, with respective resources or nodes potentially operating in parallel. In one embodiment, a workflow management resource or node may act as an aggregator for events and/or signals associated with multiple namespace partitions of the kind described above.

Multi-Partition Binary Signal Buses

Figure 5:
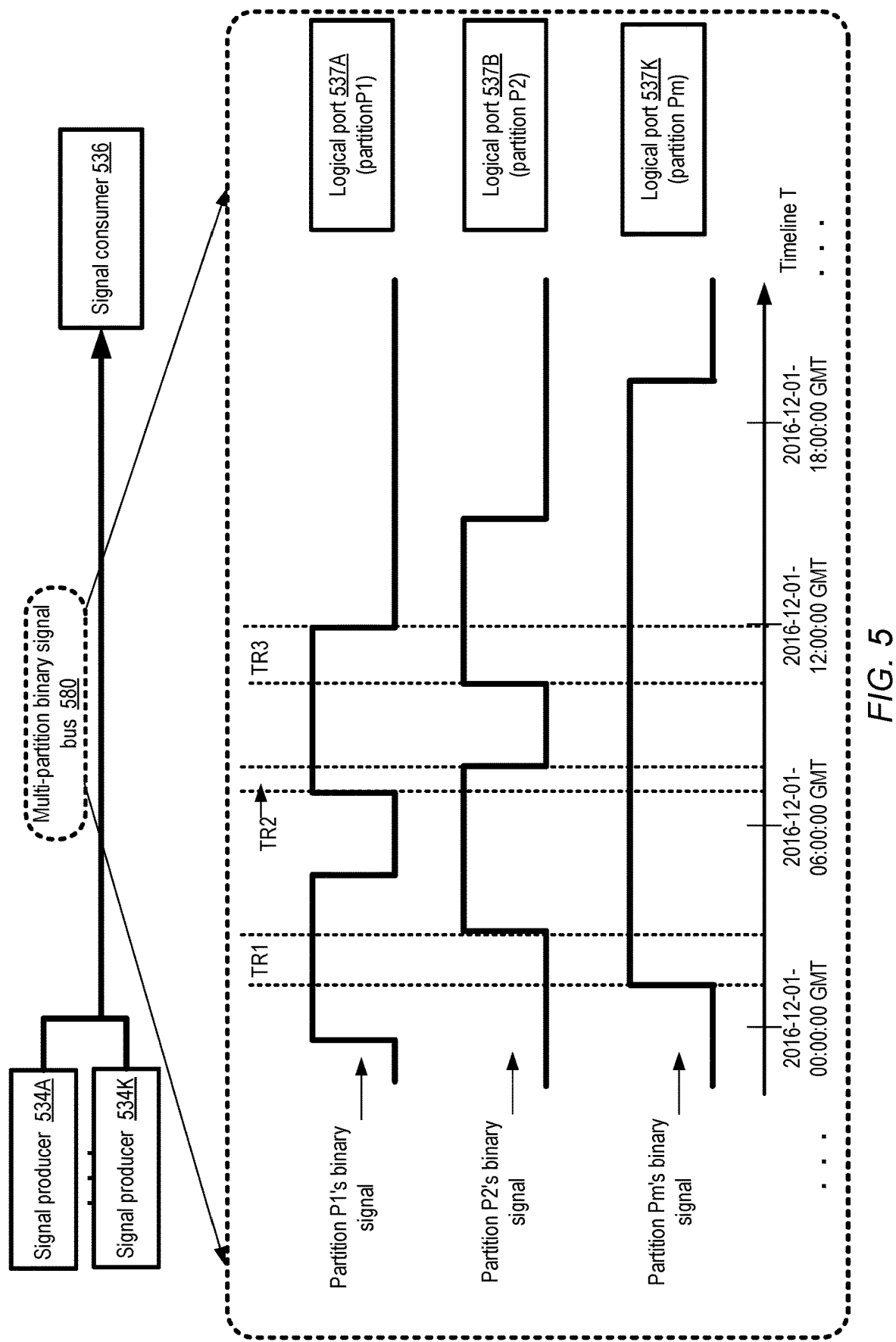
FIG. 5 illustrates an example of a multi-partition binary signal bus which may be implemented at a workflow management system, according to at least some embodiments.

The concept of persistent binary signals may be extended to multi-partition workflows in some embodiments, such that a common logical communication channel or pathway between workflow management nodes may be split into partition-specific sub-channels. FIG. 5 illustrates an example of a multi-partition binary signal bus which may be implemented at a workflow management system, according to at least some embodiments. As shown, a plurality of signal producers 536, e.g., 536A-536K may generate respective binary signals corresponding to individual partitions of a namespace. Collectively, the signals may be referred to as a binary signal bus, with distinct logical ports 537 (e.g., 537A-537K) of the bus being designated for the individual partitions. Each of the binary signals may represent a condition or state of completion of an event associated with a different partition, and respective potentially distinct validity time periods during which the condition is usable as input at a downstream node.

In the depicted example, multi-partition binary signal 580 bus indicates respective validity time periods for conditions associated with partition P1, P2 and Pm along a timeline T. If, based on the logic of the processing being performed at a signal consumer 536, all three of the conditions corresponding to P1, P2 and Pm have to be satisfied for a given action or operation to be performed, time periods TR1, TR2 or TR3 may be identified for initiating such actions or operations. In contrast, if an operation or action is dependent on any one of the input binary signals being satisfied (i.e., in the "1" state), such an action or operation may be initiated during a larger time period corresponding to the logical "OR" of the three binary signals shown in the depicted example. The concept of multiple logical ports 537 associated with a common bus 580 may be used in some embodiments to indicate that the different binary signals are closely related semantically and may typically be processed collectively. As mentioned earlier, in some embodiments, respective resources may be designated for processing associated with different partitions (e.g., at a signal producing node of a workflow, and/or at a signal consuming node). It is noted that the uses of the term "port" and "bus" in the context of the workflow management scheme are not meant to imply that corresponding hardware busses or hardware ports are necessarily used for workflow management in at least some embodiments. In one embodiment, in which for example binary signals are propagated among workflow management resources using messages sent via networking protocols such as TCP/IP (Transmission Control Protocol/Internet Protocol), respective ports defined in the protocol may be assigned for communications associated with respective partitions. However, in other embodiments, instead of using network messages, communication between workflow management resources may be implemented by updating state information (which may include identifiers or schemas associated with logical ports) in a repository readable by the intended recipients of the communication, and distinctions between networking protocol ports used may be irrelevant to the communications.

Workflow Manager Node Categories

Figure 6:
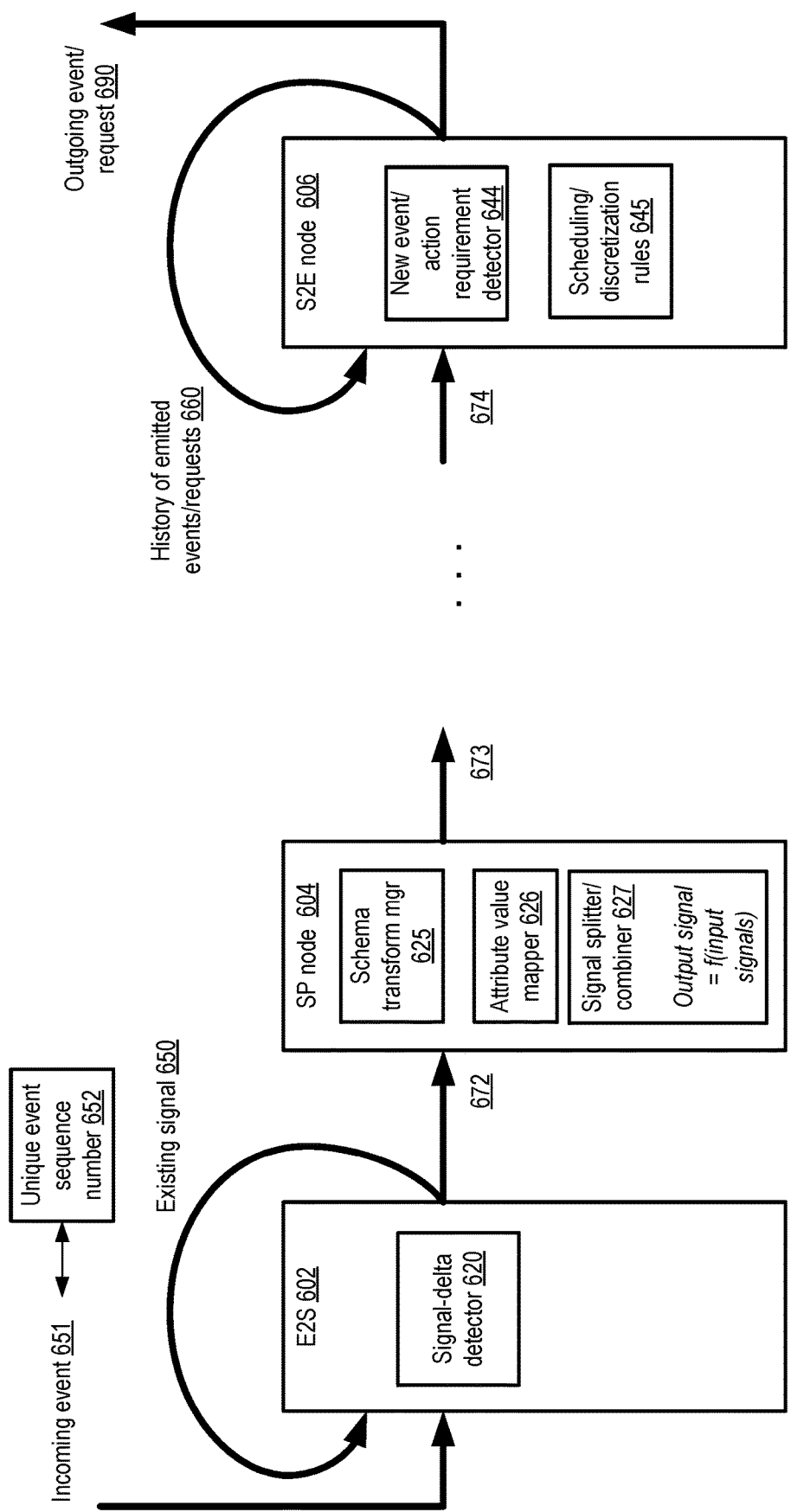
FIG. 6 provides an overview of the functions which may be performed at respective types of workflow management nodes, according to at least some embodiments.

As mentioned earlier, several different types of nodes may be connected in a graph representing the logic of a given workflow in some embodiments. FIG. 6 provides an overview of the functions which may be performed at respective types of workflow management nodes, according to at least some embodiments.

Incoming events 651, e.g., resulting from actions or operations performed outside the workflow management system, may be directed to one or more E2S (event-to-signal) nodes 602 of a given workflow in the depicted embodiment. The mechanisms used for obtaining information about, or detecting, the input events 651 may differ in various embodiments. In one embodiment, for example, respective events may be submitted by action executors (or by nodes of the workflow itself) as records to a stream management service accessible from the workflow management service. The stream management service may implement a subscription mechanism, in accordance with which subscriber entities (such as resources implementing E2S nodes) may be notified or informed when new stream records associated with topics or partitions of interest to the subscribers are received. In other embodiments, the action executors and/or other event generators may be provided the network endpoint addresses (e.g., IP addresses) of E2S resources, and may transmit messages indicating the occurrences of events to the E2S resources. Each of the events may have explicit or implicit validity periods associated with them, during which the occurrence of the events may be usable to make decisions or perform operations at one or more downstream nodes. In some implementations, at least some validity time periods may be indicated by the event generators themselves, while other validity time periods may be defined as parameters of the workflow or parameters associated with partitions of the workflow namespace. In at least one embodiment, a unique sequence number (e.g., either globally unique or unique within a partition) 652 may be assigned to each input event, and may be stored in persistent storage along with signal representations, so that it becomes possible to identify relationships between different events and the signals generated for the events.

In some embodiments, in response to determining that an input event 651 has occurred, a resource implementing an E2S node 602 may retrieve the representation of an existing input signal or signal bus associated with the event from persistent storage, e.g., based on the partition identifier associated with the event 651 and/or the sequence number 652. Other input buses may be held constant from the last execution iteration of the E2S node logic in such embodiments. This may make it easier to reason about the E2S node's execution model, as the effects of any given event 651 may be limited to the particular signal associated with the event. A signal delta detector 620A of the E2S node 602 may process the input bus or busses to determine whether the contents of an output bus 672 of the E2S need to be changed. If so, a representation of the output bus 672 may be stored in persistent storage in some embodiments. In one embodiment, the change to the output of a node may be represented as another event, with a new sequence number associated with it.

A signal processor (SP) node 604 may perform at least three types of operations in the depicted embodiment. An input schema associated with signals received at the SP 604 may differ from an output schema of the SP, e.g., according to one or more schema transformation rules implemented at schema transformation manager component 625 in some embodiments. In addition to or instead of schema changes, in some embodiments values of attributes of some of the input data associated with incoming signals may be mapped to different values in the output data associated with outgoing signals, e.g., based on a set of rules implemented by an attribute value mapper 626. In one embodiment, logical operations on the input signals, such as union, intersection, multiplexing/splitting, or de-multiplexing/combining operations may also be implemented at an SP node 604 to produce the output signals 673, e.g., by a signal splitter/combiner component 627. It is noted that not all the components shown with respect to an SP node 604 may be implemented or supported in some embodiments, and other types of transformations of input signals to produce output signals may be supported in some embodiments.

One or more input signals 674 may eventually be received at resources implementing a signal-to-event (S2E) node in the depicted embodiment. Based on an analysis of the newly received signals and a record of the history of already-emitted events and requests 660, a decision as to whether a new output event or request 690 is to be generated may be made at the S2E node. Depending on the workflow's requirements, it may sometimes be the case that a request or event which could be triggered by the new combination of input signals has already been transmitted as output, or that no new output is required despite the change in the input 674. In the depicted embodiment, the S2E node may also be responsible for implementing scheduling/discretization rules 645, which may impose constraints on how often or when output signals or requests may be produced (e.g., independently of the validity time intervals of input signals 674). In one embodiment, for example, a given S2E node may only be allowed to transmit requests to external action executors once a day, or once an hour, or at other intervals. In some embodiments, the scheduling/discretization rules may differ from one partition to another. It is noted that the kinds of operations performed at the different types of workflow nodes in some embodiments, and/or the types of workflow nodes themselves, may differ from those indicated in FIG. 6.

Example Object Types Used for Managing Dependencies

Figure 7:
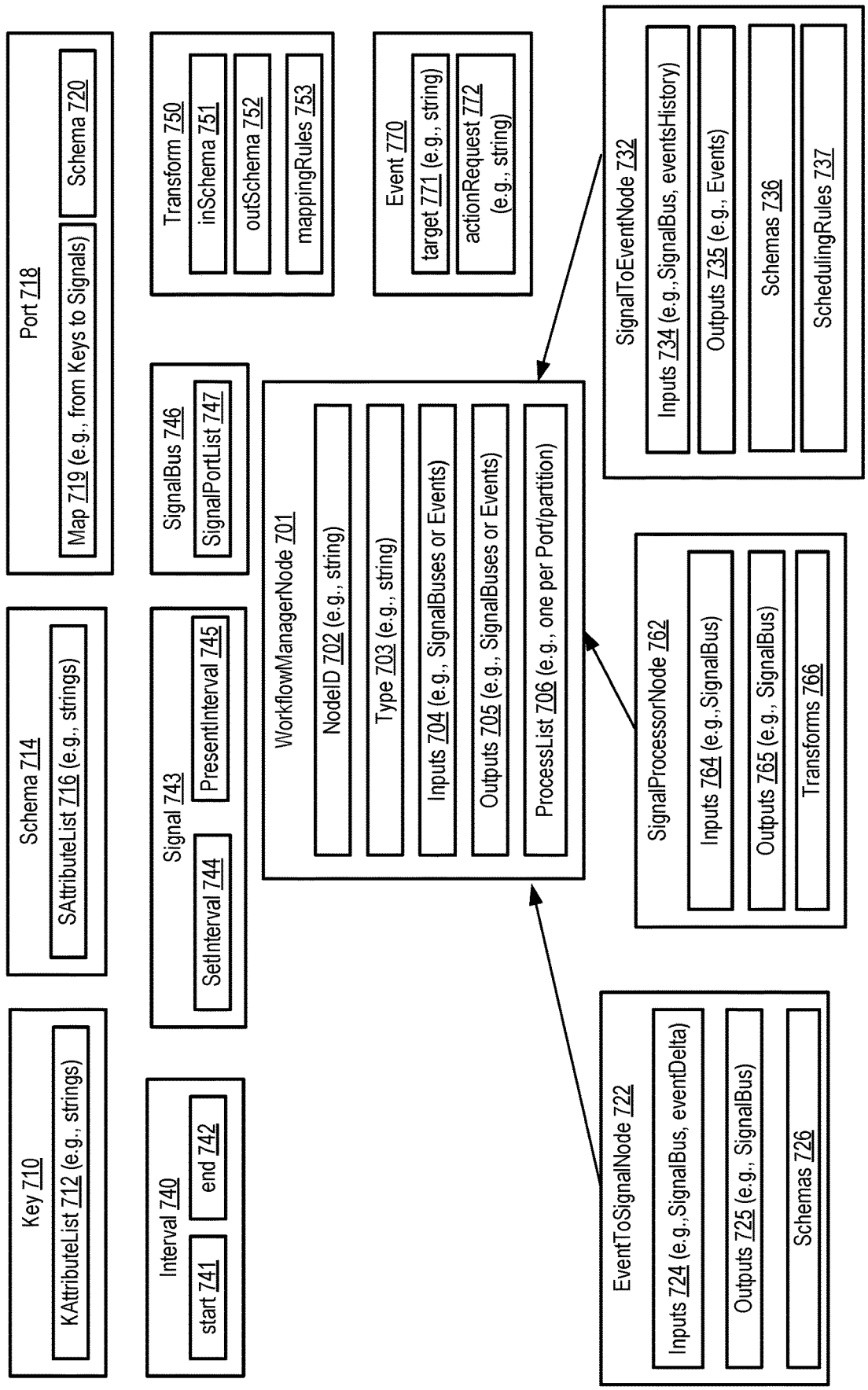
FIG. 7 illustrates examples of object types which may be instantiated and stored to manage workflow dependencies, according to at least some embodiments.

FIG. 7 illustrates examples of object types which may be instantiated and stored to manage workflow dependencies, according to at least some embodiments. It is noted that, to reduce clutter, not all the object types which may be used in various embodiments are shown or fully defined in FIG. 7 (for example, the structures or elements of Processes, SchedulingRules, start and end times of Intervals, and some other object types are not explicitly defined).

As indicated by its name, the WorkflowManagerNode object type 701 may be used to store and process information about various types of workflow nodes in the depicted embodiment. At least three child types of a parent WorkflowManagerNode object type may be defined in various embodiments: an EventToSignalNode object type 722 (for representing E2S nodes similar to those discussed above), a SignalProcessorNode object type 762 (for representing SP nodes similar to those discussed above), and a SignalToEventNode object type 732 (for representing S2E nodes similar to those discussed above). Each WorkflowManagerNode object may have a NodeID attribute 702 (which may, for example, take string values), a Type attribute 703 (indicating, for example, whether it is an E2S, SP or S2E node), one or more Inputs 704, and one or more Outputs 705. A ProcessList 706 may represent the processes or threads of executions which implement the logic of a WorkflowManagerNode 701 in some embodiments—e.g., one process or thread of execution may be instantiated per partition or logical Port.

Inputs 724 of an EventToSignalNode 722 may include a SignalBus (e.g., representing the existing set of signals output from the node) and/or an eventDelta (indicating an external Event) in the depicted embodiment, Outputs 725 may comprise a SignalBus, and the schemas associated with the input and/or output signal buses may be represented by the Schemas attribute 726.

In the depicted embodiment, Inputs 764 as well as Outputs 765 of a SignalProcessorNode 762 may comprise respective SignalBuses, and the SignalProcessorNode may apply a set of operations indicated in the Transforms 766 on its Inputs 764 to prepare its Outputs 765. A given Transform 750 may have an associated inputSchema 751, an outputSchema 752, and/or a set of mapping rules 753 specifying the kinds of transformation operations to be performed.

Inputs 734 of a SignalToEventNode 732 may comprise a SignalBus and a history of previously generated events or action requests in the depicted embodiment. Outputs 735 may include one or more Events, which may correspond to requests for actions to be performed by external entities in some embodiments. SchedulingRules 737 may indicate exactly how discrete events or action requests are to be scheduled based on the evaluation of continuous input signals, and Schemas 736 may indicate input and output data object types associated with the corresponding signal buses.

A given SignalBus object 746 may comprise a plurality of Signal objects with associated Ports (collectively forming a SignalPortList object 747) in the depicted embodiment. A given Signal may comprise a SetInterval 744 (indicating a period during which the signal is set to the binary value "1") and a PresentInterval 745 (indicating a period during which the signal is set to "0"). The PresentInterval 745 may be used, for example, to distinguish between an explicit "0" signal and an absence of a signal (which may, in some cases, also be represented by a "0" value). As mentioned earlier, in some embodiments, more than just two values may be used for signals in some embodiments, in which case the definitions of the Signal object may be expanded to cover all the different feasible values. A given Interval object 740 may have a start time 741 and an end time 742 in the depicted embodiment. The constituent attributes of Keys 710, Schemas 714 and Ports 718 which may be used to handle partitioning as discussed earlier are also shown.

Methods for Workflow Dependency Management

Figure 8:
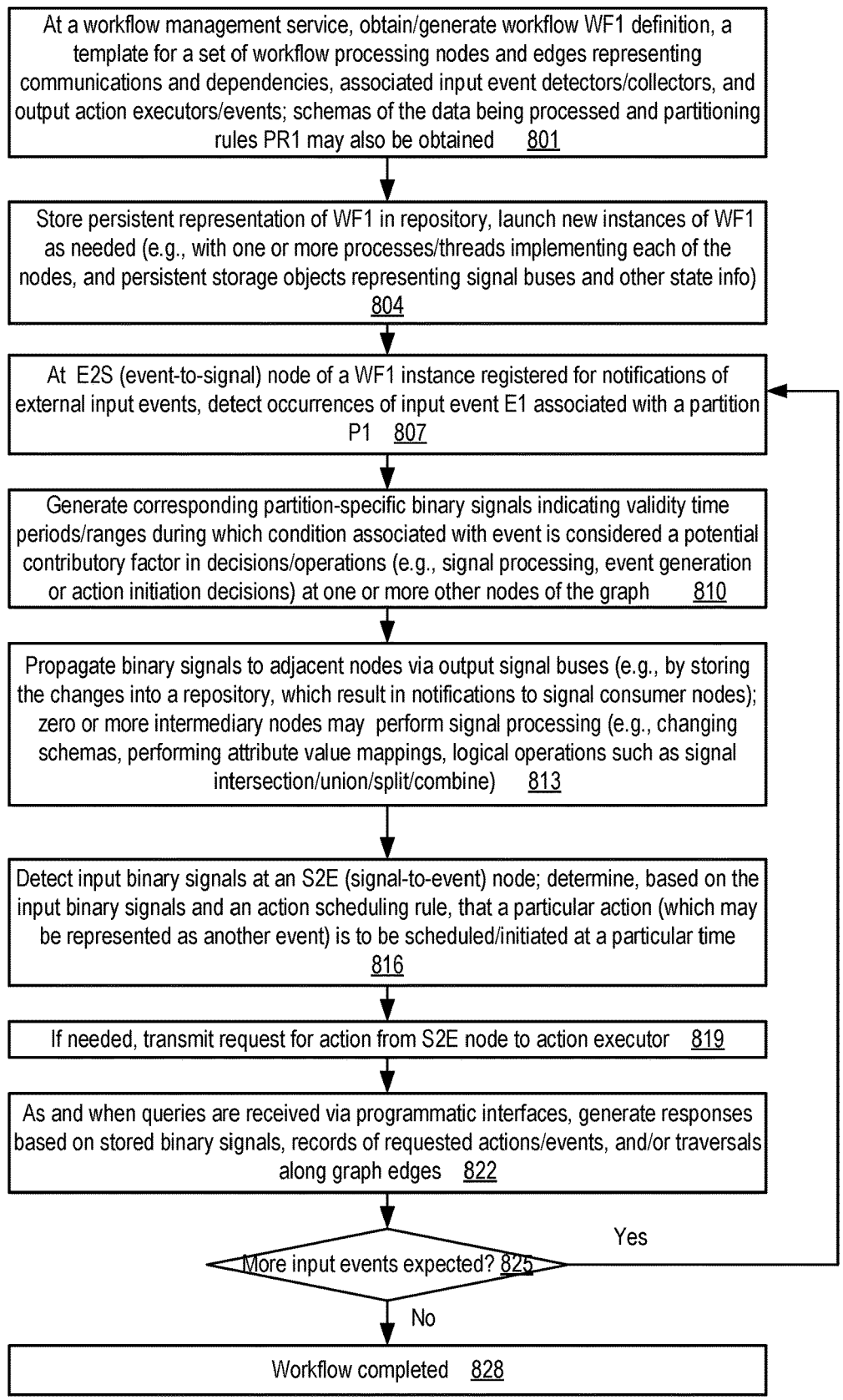
FIG. 8 is a flow diagram illustrating aspects of operations that may be performed at a workflow management system, according to at least some embodiments.

FIG. 8 is a flow diagram illustrating aspects of operations that may be performed at a workflow management system, according to at least some embodiments. As shown in element 801, a workflow definition WF1 comprising a template for a set of workflow management tasks of an application, and the inter-task dependencies, may be obtained or generated at a workflow management service or system. WF1 may, for example, comprise a graph in some embodiments, with a set of nodes (such as the E2S, SP and S2E nodes discussed earlier) connected by directed edges, where the edges represent communications and/or dependencies between the processing tasks to be performed at the nodes. In one embodiment, the workflow management service may implement a set of programmatic interfaces (such as a graphical user interface, or a set of APIs) which can be used by clients to define workflows. In various embodiments, representations of input event detectors/collectors, action initiators to which requests for various operations may be transmitted from the workflow nodes, schemas for the data which is to be analyzed and/or modified at the workflow nodes, and a set of partitioning rules for subdividing the namespace associated with the workflow may also be obtained, e.g., via programmatic interfaces.

A persistent representation of the workflow definition WF1 may be stored at a repository (element 804) in the depicted embodiment, from which it may be retrieved when a new instance of the workflow is to be launched. Each new instance may, for example, comprise respective sets of one or more resources for implementing the logic of each of the nodes indicated in the definition. A number of different approaches towards implementing a given workflow instance may be taken in different embodiments. For example, in one embodiment, a respective process or thread of execution may be launched for each combination of a workflow node and a partition of the namespace. In some embodiments, each node may be implemented using a different computing device or host, while in other embodiments, multiple nodes may be implemented using a single computing device or host. Similarly, communications or dependencies among the nodes may be implemented in a variety of ways in different embodiments. In one embodiment, in order for one node N1 to communicate with another node N2 of a given workflow, N1 may update a persistent storage object (e.g., a database table), and N2 may subscribe to notifications of changes to the storage object. In other embodiments, in addition to or instead of using persistent storage objects, messages sent via any desired networking protocol may be used. Polling-based techniques may be used in some implementations. An instance of WF1 may be launched, e.g., in response to a request received via a programmatic interface at the service.

As shown in element 807, an indication of the occurrence of an external event E1 may be obtained at an E2S node of the workflow instance. E1 may be associated with a particular partition P1 of the workflow namespace based on the partitioning rules PRI associated with WF1 in some embodiments, and an E2S resource (e.g., a thread or process) to which P1 has been assigned may be responsible for detecting and processing E1. In some embodiments, external events may be handled using a stream management service of a provider network, at which each new event is published as a new stream record with an associated unique sequence number, and a key specified to the stream management service is used to determine the specific partition with which the event is to be associated. In one such embodiment, the unique sequence number associated with an event may be stored with, or as part of, a binary signal generated to represent the occurrence of the event at the workflow management service.

In at least one embodiment, one or more partition-specific persistent binary signals indicative of E1 may be generated and propagated to other nodes (element 810) from the E2S node. Each of the signals may indicate at least one validity time period or range corresponding to a condition associated with E1. A validity time period or range may indicate, for example, a continuous time interval during which the most recent occurrence of E1 is usable as input in a decision or operation performed at one or more other nodes, such as operations involving signal processing, action initiation, or generation of other events.

The binary signals may be propagated to adjacent nodes of the workflow instance via output signal buses of the kind described above by the E2S node (e.g., by storing the changes into a repository, which result in notifications to signal consumer nodes) (element 813). Zero or more intermediary nodes may perform signal processing on the output produced by the E2S node (e.g., by changing schemas, implementing attribute value mappings, implementing logical operations such as signal intersections/unions/splits/combines, etc.) before a signal resulting from the E2S node's operations eventually reaches an S2E node in the depicted embodiment.

At the S2E node, based at least in part on its input binary signals (at least some of which may represent a consequence of the occurrence of E1) and an action scheduling rule, a determination may be made that a particular action is to be scheduled/initiated at a particular time (element 816). The initiation or completion of the requested action may itself be represented as another event at the workflow management service in at least some embodiments. The action scheduling rule may be considered a continuous-signal-to-discrete-event transformation rule in various embodiments, as the validity time ranges of the input signals received at the S2E node may represent continuous intervals, while intervals between successive outputs of the S2E node may be constrained to discrete units. For example, in one embodiment, an S2E node may be configured to generate output events or requests only once an hour, or only once a day, depending on the requirements of the application being manages using the workflow. If, based on the processing of input signals and the scheduling rule, a request is to be transmitted to an action executor, such a request may be generated and transmitted (element 819) in the depicted embodiment. Records of such requests may be stored, e.g., in the form of events, in a persistent repository by the S2E node.

The workflow management service may implement a variety of programmatic interfaces in the depicted embodiment, including one or more interfaces which can be used by clients to query the status of different workflows or actions. In response to a query received via such an interface, the service may generate a reply based on an examination of the appropriate set of binary signals and/or records of action requests or events (element 822). In some cases, for example to follow a chain of upstream dependencies, a response to a query may involve traversing a path comprising one or more edges of the workflow graph, with several different nodes and/or associated signal states being examined. If more events are anticipated in the current workflow (as detected in element 825), the operations corresponding to elements 807 onwards may be iterated. Otherwise, the execution of the current workflow instance corresponding to WF1 may be deemed complete (element 828).

It is noted that in various embodiments, at least some operations other than those illustrated in the flow diagram of FIG. 8 may be used to implement the workflow and dependency management techniques described above. Some of the operations shown may not be implemented in some embodiments or may be implemented in a different order, or in parallel rather than sequentially.

Use Cases

The techniques described above, of using persistent binary signals comprising temporal components to manage dependencies between various workflow operations, may be useful in a variety of embodiments. Many workflow applications, such as those used to manage large retail warehouses and associated databases, may involve complex interactions and dependencies between tasks, with some of the dependencies being time dependent and/or dependent on the particular partition of the database which is affected by various external or internal events. Determining the status of a particular task of a given business workflow, or exactly why some task was not performed in an expected time frame, may require a tedious analysis involving numerous ad-hoc and partition-dependent queries being directed to various different data sources. Using the signal bus techniques described herein, responding to such queries, and managing the workflow operations in general, may be substantially simplified. Furthermore, such techniques may enable customization of various aspects of workflow management with very little effort—e.g., changes to the timing granularities at which workflow decisions are made may be implemented simply by modifying a few parameters.

Illustrative Computer System

Figure 9:
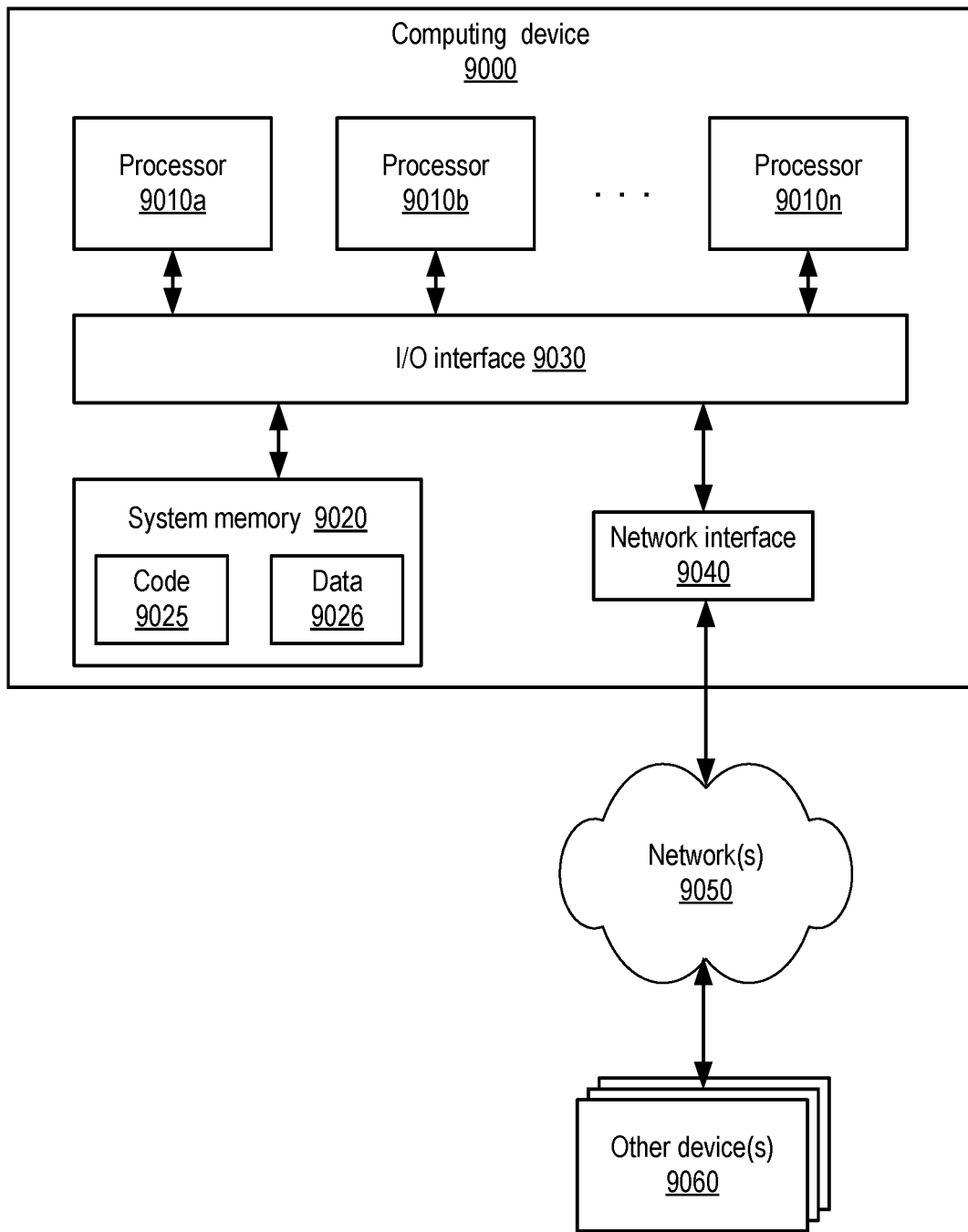
FIG. 9 is a block diagram illustrating an example computing device that may be used in at least some embodiments.

In at least some embodiments, a server that implements a portion or all of one or more of the technologies described herein, including the techniques to implement various workflow components or nodes, event detectors/collectors, action executors, associated repositories and the like may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices:
managing execution of a data processing workflow based at least in part on detection of different events, including a data load completion event and a data extraction completion event;
receiving a query pertaining to the data processing workflow, and in response:
analyzing at least a representation of a time-varying validity of a condition associated with a particular event of the different events, wherein the condition is used as a contributory factor in a decision or operation of the data processing workflow during one or more validity periods; and
providing, based at least in part on said analyzing, a response to the query.

2. The method as recited in claim 1, further comprising performing, at the one or more computing devices:
detecting an occurrence of the particular event;
generating, based at least in part on said detecting, the representation of the time-varying validity of the condition; and
storing the representation at a persistent storage device.

3. The method as recited in claim 1, further comprising performing, at the one or more computing devices:
initiating, based at least in part on an analysis of the representation of the time-varying validity of the condition, a particular action of the data processing workflow.

4. The method as recited in claim 3, wherein the representation of a time-varying validity of the condition is generated at a first resource corresponding to a first node of a plurality of nodes of a graph associated with the data processing workflow, and wherein said initiating is performed at a second resource corresponding to a second node of the plurality of nodes.

5. The method as recited in claim 1, wherein the representation of a time-varying validity of the condition comprises a binary signal.

6. The method as recited in claim 1, wherein the particular event comprises a completion of a transformation of a data set from a first format to a second format, a completion of a cleansing operation on a data set, or a completion of a data processing action requested by a resource corresponding to a first node of a plurality of nodes of a graph associated with the data processing workflow.

7. The method as recited in claim 1, further comprising performing, at the one or more computing devices:
obtaining, at a first resource corresponding to a first node of a plurality of nodes of a graph associated with the data processing workflow, an indication of one or more attribute values corresponding to respective object types of a first schema associated with the particular event;
generating, by the first resource based at least in part on said obtaining, one or more attribute values corresponding to respective object types of a second schema, wherein at least one object type of the second schema is not included in the first schema; and
causing, by the first resource, the generated attribute values of the second schema to be obtained at a second resource corresponding to a second node of the graph.

8. A system, comprising:
one or more computing devices;
wherein the one or more computing devices include one or more processors and are configured to:
manage execution of a data processing workflow based at least in part on detection of different events, including a data load completion event and a data extraction completion event;
receive a query pertaining to the data processing workflow, and in response:
analyze at least a representation of a time-varying validity of a condition associated with a particular event of the different events, wherein the condition is used as a contributory factor in a decision or operation of the data processing workflow during one or more validity periods; and
provide, based at least in part on the analysis, a response to the query.

9. The system as recited in claim 8, wherein the one or more computing devices are further configured to:
   detect an occurrence of the particular event;
   generate, based at least in part on the detection, the representation of the time-varying validity of the condition; and
   store the representation at a persistent storage device.

10. The system as recited in claim 8, wherein the one or more computing devices are further configured to:
    initiate, based at least in part on an analysis of the representation of the time-varying validity of the condition, a particular action of the data processing workflow.

11. The system as recited in claim 10, wherein the representation of a time-varying validity of the condition is generated at a first resource corresponding to a first node of a plurality of nodes of a graph associated with the data processing workflow, and wherein the particular action is initiated at a second resource corresponding to a second node of the plurality of nodes.

12. The system as recited in claim 8, wherein the representation of a time-varying validity of the condition comprises a binary signal.

13. The system as recited in claim 8, wherein the data processing workflow comprises an Extract, Transform, and Load (ETL) workflow associated with one or more repositories.

14. The system as recited in claim 8, wherein the one or more computing devices are further configured to:
    identify, based at least in part on one or more attributes of the particular event, a first partition of a workflow namespace with which the particular event is associated;
    select, based at least in part on the first partition, a first resource of a plurality of resources associated with the data processing workflow as a destination of a notification regarding the particular; and
    notify the first resource regarding the particular event.

15. One or more non-transitory computer-accessible storage media storing program instructions that when executed on or across one or more processors cause one or more computer systems to:
    manage execution a data processing workflow based at least in part on detection of different events, including a data load completion even and a data extraction completion event;
    obtain a query pertaining to the data processing workflow, and in response:
       analyze at least a representation of a time-varying validity of a condition associated with a particular event of the different events, wherein the condition is used as a contributory factor in a decision or operation of the data processing workflow during one or more validity periods; and
       provide, based at least in part on the analysis, a response to the query.

16. The one or more non-transitory computer-accessible storage media as recited in claim 15, storing further program instructions that when executed on or across one or more processors further cause one or more computer systems to:
    detect an occurrence of the particular event;
    generate, based at least in part on the detection, the representation of the time-varying validity of the condition; and
    store the representation at a persistent storage device.

17. The one or more non-transitory computer-accessible storage media as recited in claim 15, storing further program instructions that when executed on or across one or more processors further cause one or more computer systems to:
    initiate, based at least in part on an analysis of the representation of the time-varying validity of the condition, a particular action of the data processing workflow.

18. The one or more non-transitory computer-accessible storage media as recited in claim 17, wherein the representation of a time-varying validity of the condition is generated at a first resource corresponding to a first node of a plurality of nodes of a graph associated with the data processing workflow, and wherein the particular action is initiated at a second resource corresponding to a second node of the plurality of nodes.

19. The one or more non-transitory computer-accessible storage media as recited in claim 15, storing further program instructions that when executed on or across one or more processors further cause one or more computer systems to:
    in response to obtaining an indication of a second event, update, without invoking a concurrency control protocol, the representation of the time-varying validity of the condition.

20. The one or more non-transitory computer-accessible storage media as recited in claim 15, wherein the data processing workflow comprises an Extract, Transform, and Load (ETL) workflow associated with one or more repositories.

* * * * *